US012294456B2

(12) United States Patent
Feng et al.

(10) Patent No.: US 12,294,456 B2
(45) Date of Patent: May 6, 2025

(54) BLIND DETECTION METHOD FOR CONTROL CHANNEL, TERMINAL, AND STORAGE MEDIUM

(71) Applicant: UNISOC (CHONGQING) TECHNOLOGIES CO., LTD., Chongqing (CN)

(72) Inventors: Qiao Feng, Chongqing (CN); Zhihui Zhu, Chongqing (CN); Shu Tan, Chongqing (CN)

(73) Assignee: UNISOC (CHONGQING) TECHNOLOGIES CO., LTD., Chongqing (CN)

( * ) Notice: Subject to any disclaimer, the term of this patent is extended or adjusted under 35 U.S.C. 154(b) by 389 days.

(21) Appl. No.: 17/733,245

(22) Filed: Apr. 29, 2022

(65) Prior Publication Data

US 2022/0255659 A1   Aug. 11, 2022

Related U.S. Application Data

(63) Continuation of application No. PCT/CN2020/094409, filed on Jun. 4, 2020.

(30) Foreign Application Priority Data

Oct. 30, 2019   (CN) .......................... 201911047302.3

(51) Int. Cl.
*H04L 1/00* (2006.01)
*H04W 72/23* (2023.01)

(52) U.S. Cl.
CPC ........... *H04L 1/0038* (2013.01); *H04W 72/23* (2023.01)

(58) Field of Classification Search
CPC .............................. H04L 1/0038; H04W 72/23

USPC .......................................................... 370/329
See application file for complete search history.

(56) References Cited

U.S. PATENT DOCUMENTS

| | | | | |
|---|---|---|---|---|
| 2013/0205176 A1* | 8/2013 | Qian | ....................... | H04L 1/208 714/704 |
| 2018/0367263 A1 | 12/2018 | Ying et al. | | |
| 2021/0266910 A1* | 8/2021 | Yliuntinen | ........ | H04W 72/0446 |

FOREIGN PATENT DOCUMENTS

| | | | |
|---|---|---|---|
| CN | 103891367 | A | 6/2014 |
| CN | 104202828 | A | 12/2014 |
| CN | 105577336 | A | 5/2016 |
| CN | 105634668 | A | 6/2016 |
| CN | 106454694 | A | 2/2017 |
| CN | 107006041 | A | 8/2017 |
| CN | 108702760 | A | 10/2018 |
| CN | 109309550 | A | 2/2019 |
| CN | 110278062 | A | 9/2019 |
| WO | 2014056148 | A1 | 4/2014 |
| WO | 2014173185 | A1 | 10/2014 |
| WO | 2019029657 | A1 | 2/2019 |

* cited by examiner

*Primary Examiner* — Nicholas R Taylor
*Assistant Examiner* — Chong G Kim
(74) *Attorney, Agent, or Firm* — HAUPTMAN HAM, LLP

(57) ABSTRACT

The disclosure relates to a blind detection method for a control channel, a terminal, and a storage medium. The method includes: obtaining downlink control information (DCI) of a plurality of subframes through blind detection of the control channel; and determining validity of the DCI of the plurality of subframes in repetition times adopted in blind detection of the control channel to obtain a decision result.

18 Claims, 5 Drawing Sheets

BLIND DETECTION METHOD FOR CONTROL CHANNEL, TERMINAL, AND STORAGE MEDIUM

CROSS-REFERENCE TO RELATED APPLICATIONS

This application is a continuation application of International Application No. PCT/CN2020/094409, filed on Jun. 4, 2020, which claims priority to Chinese Patent Application No. 201911047302.3, filed on Oct. 30, 2019, the entire disclosure of which are incorporated herein by reference.

TECHNICAL FIELD

The disclosure relates to the technical field of communications, in particular to a blind detection method for a control channel, a terminal, and a storage medium.

BACKGROUND

In a communication system, with blind detection of a control channel, downlink control information (DCI) is obtained, and scheduling information for a downlink data channel or an uplink data channel, uplink power control information, uplink preamble transmission related information, and semi-persistent scheduling release are obtained. However, there is false detection for blind detection of the control channel, that is, a terminal detects the DCI when a base station does not transmit the DCI to the terminal, which causes unnecessary operations.

SUMMARY

According to an aspect of the present disclosure, there is provided a blind detection method for a control channel, which includes the following.

Downlink control information (DCI) of multiple subframes is obtained through blind detection of the control channel. Validity of the DCI of the multiple subframes is determined in repetition times adopted in blind detection of the control channel to obtain a decision result.

According to another aspect of the present disclosure, there is provided a terminal device, which includes a processor and a memory for storing instructions which are configured to be executed by the processor. The processor is configured to execute the above method.

According to another aspect of the present disclosure, there is provided a non-volatile computer readable storage medium configured to store computer program instructions which, when executed by a processor, are operable with the processor to implement the above method.

Other features and aspects of the present disclosure will become apparent from the following detailed description of exemplary implementations with reference to accompanying drawings.

BRIEF DESCRIPTION OF THE DRAWINGS

The accompanying drawings, which are included in and constitute a part of the specification, illustrate exemplary implementations, features and aspects of the disclosure together with the specification, and serve to explain principles of the disclosure.

DETAILED DESCRIPTION

Figure 1:
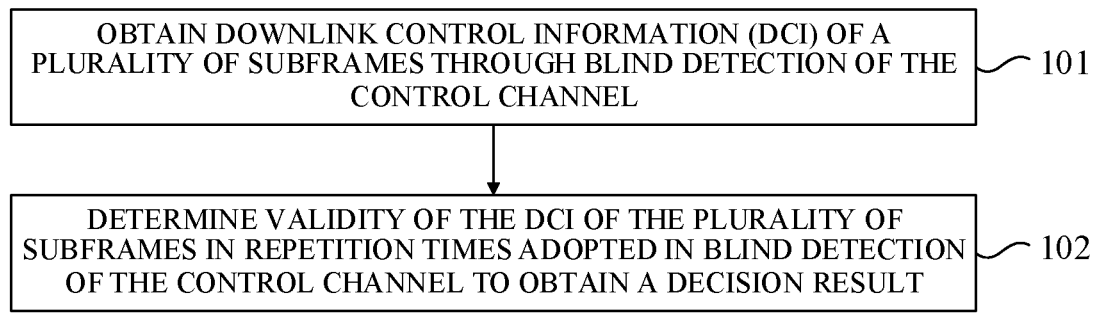
FIG. 1 is a flowchart of a blind detection method for a control channel according to implementations of the present disclosure.

Various exemplary implementations, features and aspects of the present disclosure will be described in detail below with reference to the accompanying drawings. In the drawings, a same reference sign indicates elements with same or similar functions. Although various aspects of the implementations are shown in the drawings, unless otherwise specified, the drawings are not necessarily drawn to scale.

A word "exemplary" used herein means "serving as an example, implementation or illustration". Any implementation described herein as "exemplary" need not be interpreted as superior over or better than other implementations.

In addition, in order to better explain this disclosure, numerous specific details are given in the following detailed description. It should be understood by those skilled in the art that the present disclosure can be implemented without some specific details. In some examples, methods, means, elements, and circuits well known to those skilled in the art are not described in detail in order to highlight the subject matter of this disclosure.

In a communication system, with blind detection of a control channel, DCI is obtained, and scheduling information for a downlink data channel or an uplink data channel, uplink power control information, uplink preamble transmission related information, and semi-persistent scheduling release are obtained. However, there is false detection for blind detection of the control channel, which causes unnecessary operations. In related art, a valid value range of each domain in the DCI is usually used to determine whether the DCI is false detection, where there is a possibility of false determination. Especially, when there are no invalid values or there are few invalid values in each domain in the DCI, a false determination rate of the false detection of the DCI is very high.

Therefore, a scheme of blind detection of a control channel is proposed in this disclosure. For control channels in repetitions, after DCI is obtained through blind detection for a single subframe, preliminary determination is made to get a non-false detection result (for example, the DCI can be determined as non-false detection by using valid values of each domain). Then, a reconfirmation mechanism is adopted for DCI detected in multiple frames in repetition times adopted in blind detection of the control channel to further determine validity of a non-false detection result, and invalid DCI is determined as false detection and is discarded, thus effectively reducing the false detection probability and improving blind detection accuracy for the control channel.

FIG. 1 is a flowchart of a blind detection method for a control channel according to implementations of the present disclosure. As shown in FIG. 1, the method can include the following.

At 101, a terminal device obtains downlink control information (DCI) of multiple subframes through blind detection of the control channel.

At 102, the terminal device determines validity of the DCI of the multiple subframes in repetition times adopted in blind detection of the control channel to obtain a decision result.

In the implementation of the disclosure, the control channel can adopt repeated transmission, which starts from a subframe $k_0$, that is, the network element device (i.e., network terminal) continuously transmits for r times, and payload of the DCI used in repeated transmission in r times is completely the same. An actual transmission times r of the network terminal can be $2^n$, n being 0, 1, 2, 3, . . . and 8, and the specific actual transmission times r can be set according to actual application requirements, which is not limited in this implementation. The control channel carries DCI information, and the DCI is carried on the control channel. Optionally, when the network terminal configures the DCI, the network terminal can indicate the actual repetition times of the control channel in the payload of the DCI. During wireless communication, a terminal device (i.e., a receiving terminal) needs to detect the above control channel in candidate search space to obtain decoded DCI. Because the terminal device usually cannot predict in advance where the information that needs to be received is, the above process of detecting the control channel is called blind detection, that is, blind detection for a possible control channel candidate. Further, for the above control channel with repeated transmission, the terminal device can perform blind detection of the control channel in a valid downlink subframe to obtain DCI, and adopt a reconfirm mechanism for the DCI detected in multiple frames in the repetition times of the control channel. For example, validity of each of the DCI can be determined, and DCI is discarded if it is determined as false detection, otherwise the DCI is output as DCI of non-false detection, thus effectively reducing the false detection probability and improving the blind detection accuracy for the control channel.

It should be noted that the 3rd Generation Partnership Project (3GPP) introduced enhanced machine-type Communication (eMTC) and narrow band internet of things (NB-IoT) into the Long Term Evolution (LTE) system. A physical downlink control channel of eMTC (MPDCCH) in an eMTC system adopts repeated transmission; and a physical downlink control channel of NB-IoT (NPDCCH) in an N-IoT system also adopts repeated transmission. In addition, multefire (MF) is a LTE-based technology, which is aimed at small base stations that only operate on unlicensed spectrum. In this system, the MPDCCH and the NPDCCH also adopt repeated transmission, and a principle of repeated transmission is the same as that of the MPDCCH and the NPDCCH in the 3GPP. Therefore, xPDCCH is defined in the implementations of the present disclosure, where x may represent MPDCCH in the eMTC system or the MF system of 3GPP, or NPDCCH in the NB-IoT system or the MF system of 3GPP.

For example, in the implementation of this disclosure, to illustrate a blind detection process for the control channel, a maximum transmission times $r_{max}=8$ of the network terminal is selected, that is, actual repetition times of the network terminal can be r1=1, r2=2, r3=4 and r4=8 Accordingly, the terminal device does not know the repetition times before blind detection of the repeatedly transmitted xPDCCH, so it is necessary to perform blind detection for all rj, j∈ {1,2,3,4} During the blind detection, search space of xPDCCH starts from a subframe $k=k_b$, $k_b$ is a b-th successive valid downlink subframe starting from $k_0$ (that is, a subframe used to transmission of the downlink control channel, for MPDCCCH, a valid downlink subframe is a BL/CE DL subframe; and for NPDCCH, the valid downlink subframe is an NB-IoT DL subframe), and a specific position of the start subframe can be determined according to the maximum transmission times and the search space, that is, a specific value of b can be determined according to a type of the search space. For example, there are two ways to determine a position of a start subframe $k_b$.

In a first way, it is made for user equipment specific search space (UE-specific search space), Type0-MPDCCH common search space, Type2-MPDCCH common search space, Type1A-MPDCCH common search space, and Type2A-MPDCCH common search space in the MPDCCH of the eMTC system; UE-specific search space, Type2-NPDCCH common search space, and Type2A-NPDCCH common search space in the NPDCCH of the NB-IoT system; MPDCCH UE-specific search space, Type0-MPDCCH common search space, and Type2-MPDCCH common search space in the MPDCCH of the MF system; and NPDCCH UE-specific search space and Type2-NPDCCH common search space in the NPDCCH of the MF system. Principle of repeated transmission of each of the above-mentioned xPDCCH is the same, and a reconfirm strategy of the receiving terminal is also the same. The start subframe $k=k_b$ of the search space of the xPDCCH can be determined by following formula: b=u·rj, $$u = 0, 1, \ldots \frac{r_{max}}{rj} - 1,$$

where $r_{max}$ represents maximum repetition times ($r_{max}=8$) of the control channel, J∈ {1,2,3,4}, rj represents possible actual repetition times of the control channel (r1=1, r2=2, r3=4, r4=8,) and repeated transmission patterns of the xPDCCH corresponding to different rj and $k_b$ are shown in Table 1:

Table 1 The first repeated transmission pattern of the xPDCCH corresponding to different rj and $k_b$.

| SFN | 0 | 0 | 0 | 0 | 0 | 0 | 0 | 0 | 0 | 0 | 1 | 1 | 1 |
|---|---|---|---|---|---|---|---|---|---|---|---|---|---|
| subframe | 0 | 1 | 2 | 3 | 4 | 5 | 6 | 7 | 8 | 9 | 0 | 1 | 2 |
| valid DL subframe | | ✓ | ✓ | ✓ | ✓ | ✓ | ✓ | | | | | ✓ | ✓ |
| UE with rmax = 8 xPDCCH with num of repetition = 1(r1) | | | | | | | | | | | | | |
| start subframe | | k0 | k1 | k2 | k3 | k4 | k5 | | | | | k6 | k7 |

-continued

| | | | | | | | | | | | | |
|---|---|---|---|---|---|---|---|---|---|---|---|---|
| xPDCCH from k0 | xPDCCH | | | | | | | | | | | |
| xPDCCH from k1 | | xPDCCH | | | | | | | | | | |
| xPDCCH from k2 | | | xPDCCH | | | | | | | | | |
| xPDCCH from k3 | | | | xPDCCH | | | | | | | | |
| xPDCCH from k4 | | | | | xPDCCH | | | | | | | |
| xPDCCH from k5 | | | | | | xPDCCH | | | | | | |
| xPDCCH from k6 | | | | | | | | | xPDCCH | | | |
| xPDCCH from k7 | | | | | | | | | | xPDCCH | | |
| xPDCCH with num of repetition = 2(r2) | | | | | | | | | | | | |
| start subframe | k0 | | k1 | | k2 | | | | k3 | | | |
| xPDCCH from k0 | xPDCCH | xPDCCH | | | | | | | | | | |
| xPDCCH from k1 | | | xPDCCH | xPDCCH | | | | | | | | |
| xPDCCH from k2 | | | | | xPDCCH | xPDCCH | | | | | | |
| xPDCCH from k3 | | | | | | | | | xPDCCH | xPDCCH | | |
| xPDCCH with num of repetition = 4(r3) | | | | | | | | | | | | |
| start subframe | k0 | | | | k1 | | | | | | | |
| xPDCCH from k0 | xPDCCH | xPDCCH | xPDCCH | xPDCCH | | | | | | | | |
| xPDCCH from k1 | | | | | xPDCCH | xPDCCH | | | xPDCCH | xPDCCH | | |
| xPDCCH with num of repetition = 8(r4) | | | | | | | | | | | | |
| start subframe | k0 | | | | | | | | | | | |
| xPDCCH from k0 | xPDCCH | xPDCCH | xPDCCH | xPDCCH | xPDCCH | xPDCCH | | | xPDCCH | xPDCCH | | |

As shown in Table 1 above, system frame numbers SFN are 0 and 1, namely a radio frame 0 and a radio frame 1. The sub-frames include: a subframe 0 of the radio frame 0, a subframe 1 of the radio frame 0 . . . a subframe 9 of the radio frame 0, a subframe 0 of the radio frame 1, a subframe 1 of the radio frame 1 and a subframe 2 of the radio frame 1. The valid DL subframes includes: a subframe 1 of the radio frame 0, a subframe 2 of the radio frame 0, a subframe 3 of the radio frame 0, a subframe 4 of the radio frame 0, a subframe 5 of the radio frame 0, a subframe 6 of the radio frame 0, a subframe 1 of the radio frame 1, and a subframe 2 of the radio frame 1. According to the maximum repetition times $r_{max}=8$, when repetition times of the xPDCCH xPDCCH with num of repetition=1 (that is, rj=r1), values of b can be 0, 1, 2, 3 . . . 7, that is, the start subframe includes k0 to k7, which are the subframe 1-6 of the radio frame 0 and the subframe 1 and 2 of the radio frame 1, respectively; when xPDCCH with num of repetition=2 (that is, rj=r2), the start subframes include k0 to k3, which are the subframe 1 of the radio frame 0, the subframe 3 of the radio frame 0, the subframe 5 of the radio frame 0, and the subframe 1 of the radio frame 1, respectively; when xPDCCH with num of repetition=4 (that is, rj=r3), the start subframes include k0 and k1, which are the subframe 1 of the radio frame 0 and the subframe 5 of the radio frame 0, respectively; and when xPDCCH with num of repetition=8 (that is, rj=r4), the start subframe includes k0, which is the subframe 1 of the radio frame 0.

In a second way, it is made for Type1-MPDCCH common search space in the MPDCCH of the eMTC system; Type1-NPDCCH common search space, Type1A-NPDCCH common search space in the NPDCCH of the B-IoT system; and Type1-MPDCCH common search space in the MPDCCH and Type1-NPDCCH common search space in the NPDCCH of the MF system. Principle of repeated transmission of each of the above-mentioned xPDCCH is the same, and a reconfirm strategy of the receiving terminal is also the same. The start subframe $k=k_b$ of the search space of the xPDCCH can be determined by following formula: k=k0, that is, there is only one starting position k0 in the control channel, and repeated transmission patterns of the xPDCCH corresponding to different rj (r1=1, r2=2, r3=4, and r4=8) are shown in Table 2:

Table 2 The second repeated transmission pattern of the xPDCCH corresponding to different rj.

| SFN | 0 | 0 | 0 | 0 | 0 | 0 | 0 | 0 | 0 | 1 | 1 | 1 |
|---|---|---|---|---|---|---|---|---|---|---|---|---|
| subframe | 0 | 1 | 2 | 3 | 4 | 5 | 6 | 7 | 8 | 9 | 0 | 1 | 2 |
| valid DL | | ✓ | ✓ | ✓ | ✓ | ✓ | ✓ | | | | | ✓ | ✓ |

-continued

| subframe | | | | | | | | | |
|---|---|---|---|---|---|---|---|---|---|
| | UE with rmax = 8 | | | | | | | | |
| | xPDCCH with num of repetition = 1(r1) | | | | | | | | |
| start subframe | k0 | | | | | | | | |
| xPDCCH from k0 | xPDCCH | | | | | | | | |
| | xPDCCH with num of repetition = 2(r2) | | | | | | | | |
| start subframe | k0 | | | | | | | | |
| xPDCCH from k0 | xPDCCH | xPDCCH | | | | | | | |
| | xPDCCH with num of repetition = 4(r3) | | | | | | | | |
| start subframe | k0 | | | | | | | | |
| xPDCCH from k0 | xPDCCH | xPDCCH | xPDCCH | xPDCCH | | | | | |
| | xPDCCH with num of repetition = 8(r4) | | | | | | | | |
| start subframe | k0 | | | | | | | | |
| xPDCCH from k0 | xPDCCH | xPDCCH | xPDCCH | xPDCCH | xPDCCH | xPDCCH | | xPDCCH | xPDCCH |

As shown in Table 2 above, the system frame number, the subframes and the valid downlink subframe are the same as those in Table 1, and the start subframe corresponding to each repetition times is unique and the same, that is, when the repetition times of the xPDCCH xPDCCH with num of repetition=1 (i.e. rj=r1), the start subframe k0 is the subframe 1 of the radio frame 0; when xPDCCH with num of repetition=2 (that is, rj=r2), the start subframe k0 is the subframe 1 of the radio frame 0; when xPDCCH with num of repetition=4 (that is, rj=r3), the start subframe k0 is the subframe 1 of the radio frame 0; and when xPDCCH with num of repetition=8 (that is, rj=r4), the start subframe k0 is the subframe 1 of the radio frame 0.

On this basis, the reconfirm mechanism can be adopted for the DCI detected in multiple frames in the repetition times of the xPDCCH, thus effectively reducing the false detection probability and improving the blind detection accuracy for the control channel.

In some possible implementations, operations at 102 may include the following. The DCI is determined as non-false detection in a case that DCI of at least two subframes are the same in repetition times of the control channel. For example, during the blind detection of the control channel, validity of DCI with different frame numbers obtained in sequence can be determined, DCI which is determined as non-false detection according to the valid values of each domain in a respective repetition times in the current blind detection can be stored, and then the blind detection can be continued in this repetition times. When a new DCI identical to the stored DCI is detected, the stored DCI is determined to be valid, that is, the DCI is non-false detection.

For example, in the first repeated transmission pattern shown in Table 1, when the repetition times is 2/4/8, the validity of the DCI can be determined in the repetition times of the xPDCCH. For example, when the repetition times is 2, if DCI of k0 (the subframe 1 of the radio frame 0) is the same as DCI detected in its corresponding next valid downlink subframe (i.e. the subframe 2 of the radio frame 0), the DCI is valid DCI, that is the DCI is determined as non-false detection; if DCI of k1 (the subframe 3 of the radio frame 0) is the same as DCI detected in the subframe 4 of the radio frame 0, the DCI is determined as non-false detection; if DCI of k2 (the subframe 5 of the radio frame 0) is the same as DCI detected in the subframe 6 of the radio frame 0, the DCI is determined as non-false detection; and if DCI of k3 (the subframe 1 of the radio frame 1) is the same as DCI detected in the subframe 2 of the radio frame 1, the DCI is determined as non-false detection. When the repetition times is 4, if a same DCI is detected in two of four valid downlink subframes from k0 (the subframe 1 of the radio frame 0) to the subframe 4 of the radio frame 0, the DCI is valid DCI, that is, the DCI is determined as non-false detection; and if a same DCI is detected in two of four valid downlink subframes from k1 (the subframe 5 of the radio frame 0) to the subframe 2 of the radio frame 1, the DCI is determined as non-false detection. When the repetition times are 8, if a same DCI is detected in two of eight valid downlink subframes from k0 (the subframe 1 of the radio frame 0) to the subframe 2 of the radio frame 1, the DCI is valid DCI, that is, the DCI is determined as non-false detection. In the second repeated transmission pattern shown in Table 2, when the repetition times is 2/4/8, validity of DCI can be determined in the repetition times of the xPDCCH. For example, when the repetition times is 2, if DCI detected in a subframe k0 (the subframe 1 of the radio frame 0) is the same as that detected in the subframe 2 of the radio frame 0, the DCI is determined to be valid DCI, that is, the DCI is determined as non-false detection; when the repetition times is 4, if a same DCI is detected in two of four valid downlink subframes from k0 (the subframe 1 of the radio frame 0) to the subframe 3 of the radio frame 0, the DCI is determined as non-false detection; and when the repetition times is 8, if a same DCI is detected in two of eight valid downlink subframes from k0 (the subframe 1 of the radio frame 0) to the subframe 2 of the radio frame 1, the DCI is determined as non-false detection.

In some possible implementations, the method may further include the following. A buffer for storing the DCI is cleared in a case that the stored DCI is determined as false detection and/or before blind detection of the control channel for a start subframe. In this way, DCI in the buffer is continuously updated by clearing the buffer when blind detection for a respective valid downlink subframe is started and when the stored DCI is determined as false detection, and the validity of updated stored DCI can be determined according to a latest subframe.

In the implementation of this disclosure, at an initial stage of the blind detection (that is, before blind detection for the subframe k0), the buffer for storing DCI is cleared, data of the respective downlink subframe can be further received sequentially in the maximum repetition times and the blind detection of the xPDCCH and determination of valid value of each domain can be performed, and DCI which is determined as non-false detection and not for an end subframe 1 (a subframe where transmission of the control channel is made the last time in the actual repetition times) can be stored in the buffer.

In some possible implementations, at 102, the validity of the DCI of the multiple subframes is determined in repetition times of the control channel to obtain the decision result as follows. Validity of stored DCI is determined according to the stored DCI and DCI of a current subframe in repetition times of the control channel; the stored DCI is determined as non-false detection in a case that the stored DCI is the same as any DCI of the current subframe; and the stored DCI is determined as false detection in a case that the stored DCI is different from all of DCI of the current subframe. It should be noted that the buffer where the DCI is stored may store one or more DCI, and if it stores multiple DCI, validity determination can be performed on the multiple stored DCI sequentially. A current subframe is all valid downlink subframes traversing maximum repetition times of the xPDCCH.

For example, in the first repeated transmission pattern shown in Table 1, when the repetition times is 2/4/8, the validity of the stored DCI can be determined in the repetition times of the xPDCCH. For example, when the repetition times is 2, if DCI detected in k2 (the subframe 5 of the radio frame 0) is valid, the DCI is stored in the DCI buffer, then DCI detected in a corresponding next valid downlink subframe (i.e. the subframe 6 of the radio frame 0) is taken as DCI of the current subframe, and consistency of the DCI of the current subframe and the stored DCI (DCI detected in k2) is determined, if they are the same, the DCI detected in k2 is valid DCI, that is, the DCI detected in k2 is determined as non-false detection; when the repetition times is 4, if the DCI detected in k1 (the subframe 5 of the radio frame 0) is valid, the DCI is stored in the buffer, and if the subframe 1 of the radio frame 1 is taken as the current subframe, and the detected DCI is the same as the stored DCI (DCI detected in k1), the DCI detected in k1 is valid, that is, the DCI detected in k1 is determined as non-false detection; and when the repetition times are 8, if DCI detected in k0 (the subframe 1 of the radio frame 0) is valid, the DCI is stored in the buffer, and if the subframe 2 of the radio frame 1 is taken as the current subframe, and the detected DCI is the same as the stored DCI (DCI detected in k0), the DCI detected in k0 is valid, that is, it is determined as non-false detection. In the second repeated transmission pattern shown in Table 2, when the repetition times is 2/4/8, the validity of the stored DCI can be determined in the repetition times of the xPDCCH. For example, when the repetition times is 2, if DCI detected in a subframe k0 (the subframe 0 of the radio frame 1) is valid, the DCI is stored in the buffer, then DCI detected in the subframe 2 of the radio frame 0 is taken as DCI of the current subframe, and consistency of the DCI of the current subframe and the stored DCI (DCI detected in k0) is determined, if they are the same, the stored DCI is valid DCI, that is, the stored DCI is determined as non-false detection. When the repetition times is 4, if the DCI detected in k0 (the subframe 1 of the radio frame 0) is valid, the DCI is stored in the buffer, and if the subframe 0 of the radio frame 3 is taken as the current subframe, and the detected DCI is the same as the stored DCI (DCI detected in k0), the DCI detected in k0 is valid, that is, the DCI detected in k0 is determined as non-false detection; and when the repetition times is 8, if DCI detected in k0 (the subframe 1 of the radio frame 0) is valid, the DCI is stored in the buffer, if the subframe 2 of the radio frame 1 is taken as the current subframe, and the detected DCI is the same as the stored DCI (DCI detected in k0), the DCI detected in k0 is valid, that is, the DCI detected in k0 is determined as non-false detection.

In some possible implementations, at 102, determining the validity of the DCI of the multiple subframes in repetition times adopted in blind detection of the control channel to obtain the decision result further includes: determining validity of the DCI of the current subframe in a case that the stored DCI is different from all of the DCI of the current subframe; determining the DCI of the current subframe as false detection in a case that a first preset condition is not satisfied; and determining the validity of the DCI of the current subframe according to a second preset condition in a case that the first preset condition is satisfied.

In some possible implementations, the first preset condition may include that actual repetition times indicated by the DCI of the current subframe is not less than repetition times adopted in current blind detection. For example, it can be determined according to the actual repetition times rj indicated in DCI payload and repetition times $rj_{re}$ adopted in the current blind detection, and if $rj<rj_{re}$, the DCI of the current subframe is determined to be invalid, that is, the DCI is determined as false detection and is discarded.

In some possible implementations, the first preset condition may further include that the validity of the DCI of the current subframe is determined according to a valid value range of each domain in the DCI. It should be noted that when the validity of the DCI of the current subframe is determined, one of the above two first preset conditions can be adopted, or at least the above two first preset conditions can be adopted at the same time, so as to obtain a more accurate validity determination result.

In some possible implementations, the second preset condition may include that the DCI of the current subframe is determined as non-false detection in a case that a current subframe number is equal to an end subframe number indicated in the DCI of the current subframe; and the stored DCI is updated according to the DCI of the current subframe in a case that the current subframe number is smaller than the end subframe number indicated in the DCI of the current subframe.

The end subframe number can be determined according to the actual repetition times of the xPDCCH indicated in the DCI obtained by blind detection, that is, the end subframe can be determined according to a value of rj indicated in the DCI payload and the start subframe $k_b$. In addition, if the value of rj is not indicated in the DCI payload, the end subframe can be determined according to the repetition times $rj_{re}$ adopted in the current blind detection and the start subframe $k_b$. For example, in the first repeated transmission pattern shown in Table 1, the repetition times is 1/2/4/8 (that is, $rj/rj_{re}$ is 1/2/3/4), and end subframes corresponding to different start subframes can be obtained as follows: if $rj/rj_{re}$ is 1, end subframes corresponding to start subframes k0-k7 are the subframe 1 of the radio frame 0, the subframe 2 of the radio frame 0, the subframe 3 of the radio frame 0, the subframe 4 of the radio frame 0, the subframe 5 of the radio frame 0, the subframe 6 of the radio frame 0, and the subframe 1/2 of the radio frame 1 in sequence; if $rj/rj_{re}$ is 2, end subframes corresponding to the start subframes k0-k3 are the subframe 2 of the radio frame 0, the subframe 4 of the radio frame 0, the subframe 6 of the radio frame 0 and the subframe 2 of the radio frame 1 in sequence; if $rj/rj_{re}$ is 3, end subframes corresponding to the start subframes k0 and k1 are the subframe 4 of the radio frame 0 and the subframe 2 of the radio frame 1, respectively; and if $rj/rj_{re}$ is 4, an end subframe corresponding to the start subframe k0 is the subframe 2 of the radio frame 1. In the second repeated transmission pattern shown in Table 2, the repetition times is 1/2/4/8 (that is, rj is 1/2/3/4), the end subframe corresponding to the start subframe k0 can be obtained as follows: if rj is 1, an end subframe corresponding to the start subframe k0 is the subframe 1 of the radio frame 0; if rj is 2, an end subframe corresponding to the start subframe k0 is the subframe 2 of the radio frame 0; if rj is 3, an end subframe corresponding to the start subframe k0 is the subframe 4 of the radio frame 0; and if rj is 4, an end subframe corresponding to the start subframe k0 is the subframe 2 of the radio frame 1.

In some possible implementations, the method may further include terminating blind detection of a candidate set corresponding to the DCI in actual repetition times indicated by the DCI in a case that the stored DCI is determined as non-false detection. In the repeated transmission pattern shown in Table 2 above, since a start subframe corresponding to the each repetition times is unique, when the stored DCI is determined as non-false detection, the blind detection of the xPDCCH can be terminated, without performing blind detection for the remaining subframes, so as to reduce blind detection times.

In this way, the above validity determination is sequentially performed on DCI detected in all valid downlink subframes (if multiple DCI are detected, on all of detected DCI) to obtain the decision result until the maximum repetition times are reached, and the blind detection of the control channel is terminated.

Figure 2:
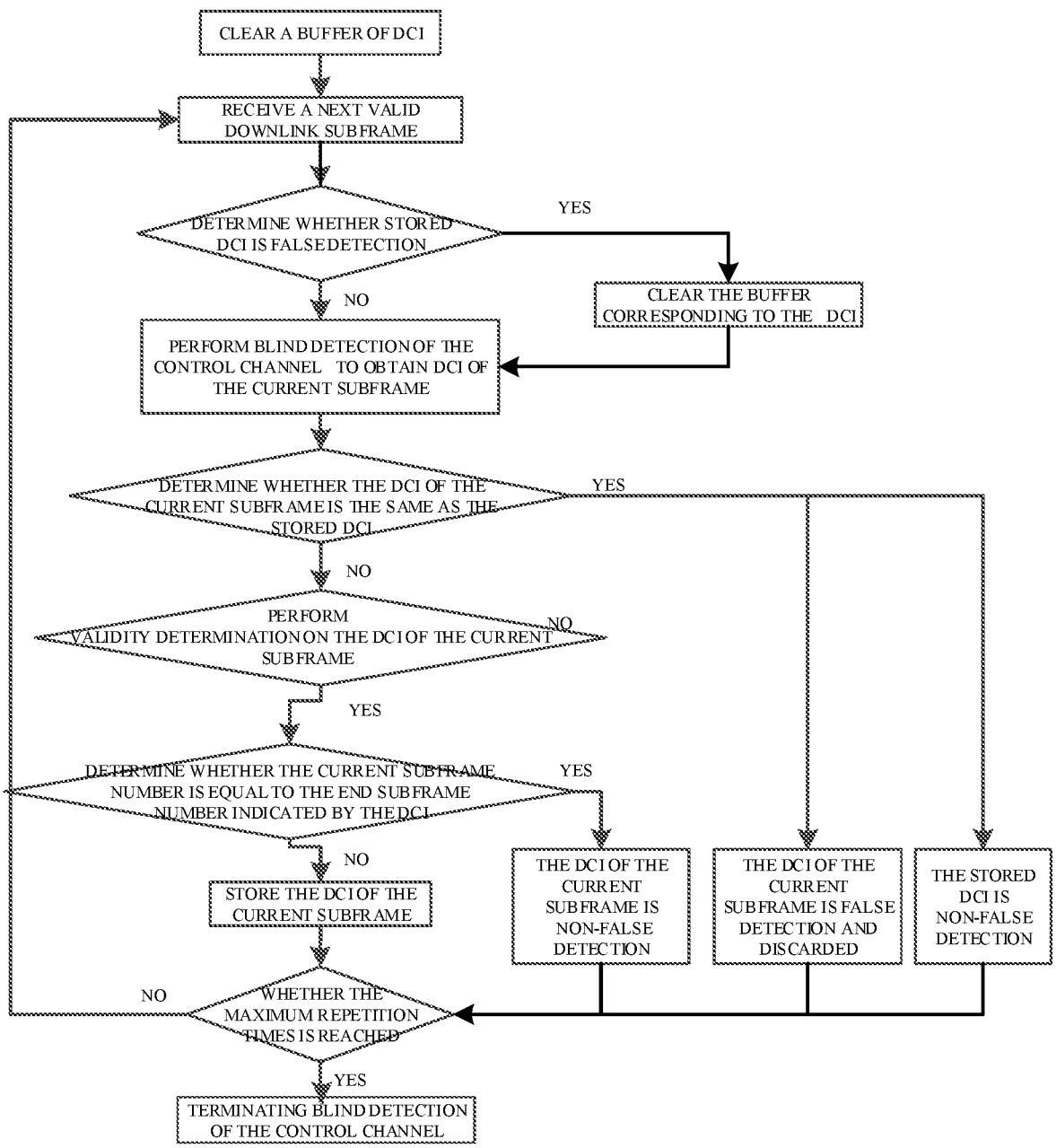
FIG. 2 is a flowchart of a blind detection method for a control channel according to implementations of the present disclosure.

For example, FIG. 2 is a flowchart of a blind detection method for a control channel according to implementations of the present disclosure. As illustrated in FIG. 2, firstly, before blind detection for the subframe $k_0$, the buffer of the DCI is cleared, and then, validity of DCI of respective frames is determined sequentially (that is, determining whether DCI is false detection or not) in the maximum repetition times. Specifically, data of respective valid downlink subframes is received sequentially (for example, data of the subframe k0 is received firstly); then, it is determined whether the stored DCI is false detection (if the buffer for storing DCI stores multiple DCI, this determination is made for the multiple DCI sequentially), and if the stored DCI has not been determined as valid DCI before, and the current subframe number is greater than the end subframe number indicated by the stored DCI, the stored DCI is determined as false detection, and the buffer corresponding to the stored DCI is cleared; otherwise, blind detection of the control channel is performed to obtain DCI of the current subframe, and then it is determined whether the DCI of the current subframe is the same as the stored DCI (when multiple DCI are detected in the current subframe, the multiple DCI detected in the current subframe are determined sequentially). During determining whether the DCI of the current subframe is the same as the stored DCI, if a certain DCI of the current subframe is the same as a certain stored DCI, the stored DCI is determined non-false detection; and if a certain DCI of the current subframe is different from all of the stored DCI, validity determination is performed on the certain DCI of the current subframe (if multiple DCI of the current subframe is different from all of the stored DCI, validity determination is performed on the multiple DCI). Further, validity of the DCI of the current subframe can be determined according to the first preset condition, and if validity of the DCI of the current subframe is determined to be invalid, the DCI is determined as false detection and discarded; if validity of the DCI of the frame is determined to be valid, it is further determined whether the second preset condition is satisfied, that is, it is further determined whether the current subframe number is equal to the end subframe number indicated by the DCI (when the current subframe corresponds to the multiple DCI, this determination is made for the multiple DCI), and when the current subframe number is equal to the end subframe number indicated by the DCI of the current subframe, it is determined that the DCI of the current subframe is valid, correspondingly, when the current subframe number is less than the end subframe number indicated by the DCI, the DCI of the current subframe is stored in the buffer to obtain a latest stored DCI. Finally, it is determined whether the maximum repetition times is reached, if the maximum repetition times is not reached, a current valid subframe number is increased by 1, and the above steps are continued to be repeated by using the latest stored DCI and a next valid downlink subframe until the maximum repetition times is reached, and then the blind detection of the control channel is terminated.

It should be noted that, although the blind detection method for the control channel is described above by taking the above implementation as an example, it can be understood by those skilled in the art that the present disclosure should not be limited to this. In fact, users can flexibly set various implementation according to their personal preferences and/or actual application scenarios, as long as they conform to technical schemes of this disclosure.

In this way, the validity of the DCI of the multiple subframes obtained by blind detection is determined in repetition times adopted in blind detection of the control channel, so as to obtain a decision result of whether the DCI is false detection, thereby reducing false detection probability and improving blind detection accuracy for the control channel.

Figure 3:
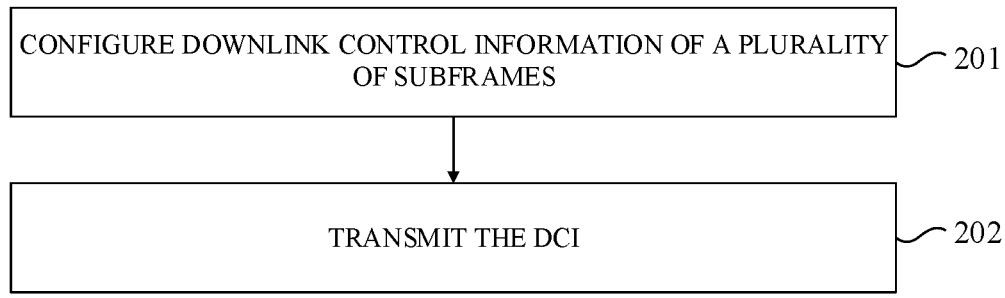
FIG. 3 is a flowchart of a blind detection method for a control channel according to implementations of the present disclosure.

FIG. 3 is a flowchart of a blind detection method for a control channel according to implementations of the present disclosure. As illustrated in FIG. 3, the method includes the following.

At 201, a network element device configures Downlink control information (DCI) of multiple subframes.

At 202, the network element device transmits the DCI.

Figure 4:
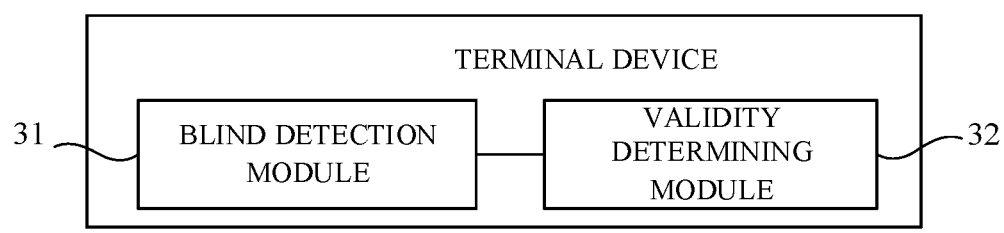
FIG. 4 is a structural diagram of a terminal device according to implementations of the present disclosure.

FIG. 4 is a structural diagram of a terminal device according to implementations of the present disclosure. As illustrated in FIG. 4, the terminal device may include a blind detection module 31 and a validity determining module 32. The blind detection module 31 is configured to obtain downlink control information (DCI) of multiple subframes through blind detection of the control channel. The validity determining module 32 is configured to determine validity of the DCI of the multiple subframes in repetition times adopted in blind detection of the control channel to obtain a decision result.

In some possible implementations, the validity determining module is further configured to determine the DCI as non-false detection in a case that DCI of at least two subframes are the same in repetition times adopted in blind detection of the control channel.

In some possible implementations, the validity determining module is further configured to determine validity of stored DCI according to the stored DCI and DCI of a current subframe in repetition times adopted in blind detection of the control channel; determine the stored DCI as non-false detection in a case that the stored DCI is the same as any DCI of the current subframe; and determine the stored DCI as false detection in a case that the stored DCI is different from all of DCI of the current subframe.

In some possible implementations, the validity determining module is further configured to determine validity of the DCI of the current subframe in a case that the stored DCI is different from all of the DCI of the current subframe; determine the DCI of the current subframe as false detection in a case that a first preset condition is not satisfied; and determine the validity of the DCI of the current subframe according to a second preset condition in a case that the first preset condition is satisfied.

In some possible implementations, the first preset condition includes that actual repetition times indicated by the DCI of the current subframe is not less than repetition times adopted in current blind detection.

In some possible implementations, the second preset condition includes that the DCI of the current subframe is determined as non-false detection in a case that a current subframe number is equal to an end subframe number indicated in the DCI of the current subframe; and the stored DCI is updated according to the DCI of the current subframe in a case that the current subframe number is smaller than the end subframe number indicated in the DCI of the current subframe.

In some possible implementations, the terminal device further includes a clearing module configured to clear a buffer for storing the DCI in a case that the stored DCI is determined as false detection and/or before blind detection of the control channel for a start subframe.

In some possible implementations, the terminal device further includes a terminating module configured to terminate blind detection of a candidate set corresponding to the DCI in actual repetition times indicated by the DCI in a case that the stored DCI is determined as non-false detection.

Figure 5:
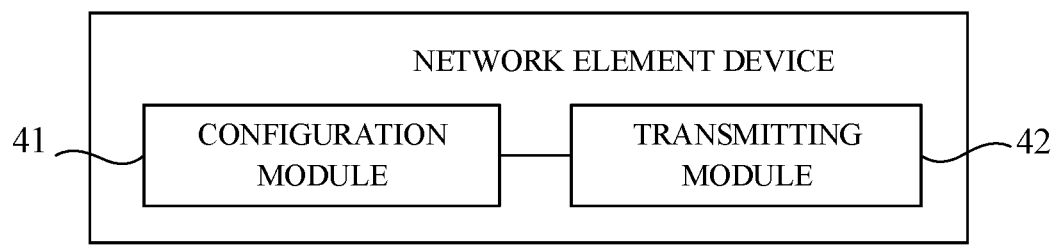
FIG. 5 is a structure diagram of a network element device according to implementations of the present disclosure.

FIG. 5 is a structure diagram of a network element device according to implementations of the present disclosure. As illustrated in FIG. 5, the network element device may include a configuration module 41 and a transmitting module 42. The configuration module 41 is configured to configure downlink control information (DCI) of multiple subframes. The transmitting module 42 is configured to transmit the DCI.

It should be noted that, although the blind detection method for a control channel, the terminal device, and the network element device are described above by taking the above implementations as examples, it can be understood by those skilled in the art that the present disclosure should not be limited to this. In fact, users can flexibly set various implementations according to their personal preferences and/or actual application scenarios, as long as they conform to technical schemes of this disclosure.

In this way, the validity of the DCI of the multiple subframes obtained by blind detection is determined in repetition times adopted in blind detection of the control channel, so as to obtain a decision result of whether the DCI is false detection, thereby reducing false detection probability and improving blind detection accuracy for the control channel.

Figure 6:
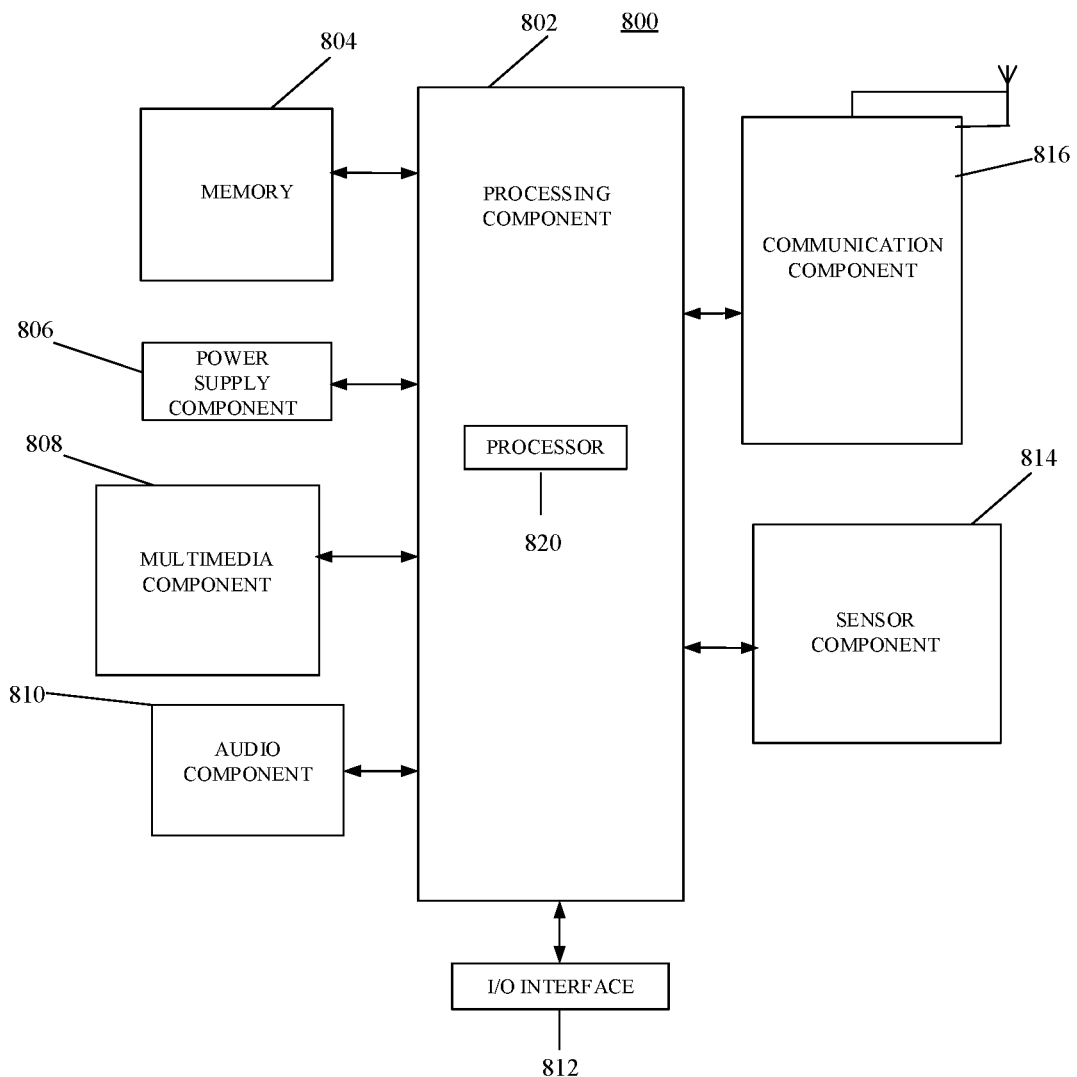
FIG. 6 is a block diagram of a terminal device for blind detection of a control channel according to implementations of the present disclosure.

FIG. 6 is a block diagram of a terminal device 800 for blind detection of a control channel according to implementations of the present disclosure. For example, the terminal device 800 can be a mobile phone, a computer, a digital broadcast terminal, a messaging device, a game console, a tablet device, a medical device, a fitness device, a personal digital assistant, or the like. Referring to FIG. 6, the terminal device 800 may include one or more of the following components: a processing component 802, a memory 804, a power supply component 806, a multimedia component 808, an audio component 810, an input/output (I/O) interface 812, a sensor component 814, and a communication component 1016.

The processing component 802 typically controls the overall operation of the terminal device 800, such as operations associated with display, telephone call, data communication, camera operation, and recording operation. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations in the terminal device 800. Examples of these data include instructions for any application or method operated on the terminal device 800, contact data, phonebook data, messages, pictures, videos, and the like. The memory 804 may be implemented by any type of transitory or non-transitory storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk, or optical disk.

The power supply assembly 806 provides power to various components of the terminal device 800. The power component 806 may include a power management system, one or more power supplies, and other components associated with generating, managing, and allocating power for the terminal device 800.

The multimedia component 808 includes a screen providing an output interface between the terminal device 800 and a user. In some implementations, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding and gestures on the touch panel. The touch sensor can not only sense the boundary of the touch or slide operation, but also detect the duration and pressure related to the touch or slide operation. In some implementations, the multimedia component 808 includes a front camera and/or a rear camera. When the terminal device 800 is in an operation mode, such as shooting mode or video mode, the front camera and/or rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC) configured to receive an external audio signal when the terminal device 800 is in an operation mode, such as a call mode, a recording mode, and a speech recognition mode. The received audio signal may be further stored in the memory 804 or transmitted via the communication component 816. In some implementations, the audio component 810 also includes a speaker for outputting an audio signal.

The I/O interface 812 provides an interface between the processing component 802 and a peripheral interface module. The peripheral interface module can be a keyboard, click wheel, button, etc. These buttons may include but are not limited to: home button, volume button, start button, and lock button.

The sensor assembly 814 includes one or more sensors for providing state evaluation on various aspects for the terminal device 800. For example, the sensor assembly 814 may detect an on/off state of the terminal device 800 and the relative positioning of the components. For example, the components are the display and keypad of the terminal device 800. The sensor component 814 can also detect position change of the terminal device 800 or one component of the terminal device 800, presence or absence of user contact with the terminal device 800, orientation or acceleration/deceleration of the terminal device 800, and temperature change of the terminal device 800. The sensor assembly 814 may include a proximity sensor configured to detect presence of nearby objects without any physical contact. The sensor assembly 814 may further include an optical sensor, such as a complementary metal oxide semiconductor (CMOS) or charge-coupled device (CCD) image sensor, for use in imaging applications. In some implementations, the sensor assembly 814 may also include an acceleration sensor, a gyroscope sensor, a magnetic sensor, a pressure sensor, or a temperature sensor.

The communication component 816 is configured to facilitate wired or wireless communication between the terminal device 800 and other devices. The terminal device 800 may access a wireless network based on a communication standard, such as wireless fidelity (WiFi), the $2^{nd}$ generation (2G) or the $3^{rd}$ generation (3G), or a combination thereof. In an exemplary implementation, the communication component 816 receives a broadcast signal or broadcast related information from an external broadcast management system via a broadcast channel. In an exemplary implementation, the communication component 816 also includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In an exemplary implementation, the terminal device 800 may be implemented by one or more application specific integrated circuits (ASIC), digital signal processors (DSPS), digital signal processing devices (DSPD), programmable logic devices (PLD), field programmable gate arrays (FPGA), controllers, microcontrollers, microprocessors, or other electronic components for performing the above methods.

In an exemplary implementation, a non-transitory computer readable storage medium is further provided, for example, a memory 804 storing computer program instructions. The computer program instructions are operable with a processor 820 of the terminal device 800 to perform the above methods.

Figure 7:
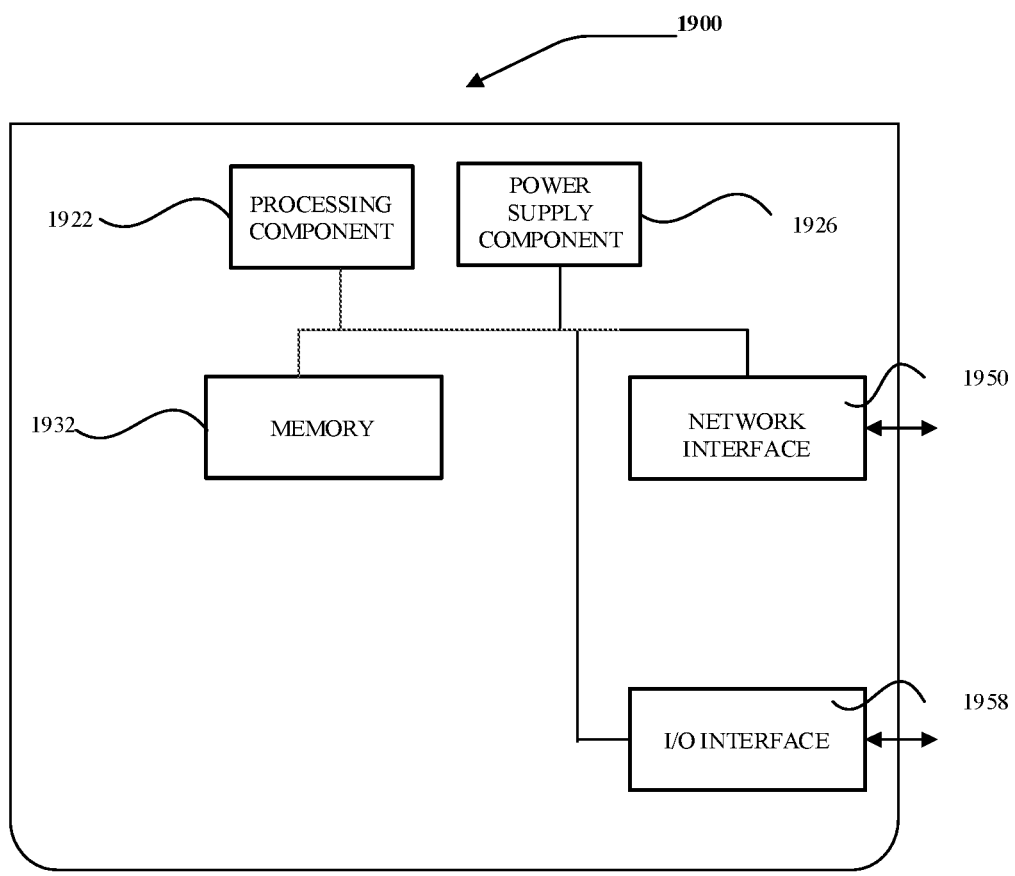
FIG. 7 is a block diagram of a network element device for blind detection of a control channel according to implementations of the present disclosure.

FIG. 7 is a block diagram of a network element device 1900 for blind detection of a control channel according to an implementation of the disclosure. For example, the network-element device 1900 can be provided as a server. Referring to FIG. 7, the network-element device 1900 includes a processing component 1922, which further includes one or more processors as well as memory resources represented by a memory 1932 and configured to store instructions (such as applications) executable with the processing component 1922. The application stored in the memory 1932 may include one or more modules, each corresponding to a set of instructions. In addition, the applications stored in the processing component 1922 is configured to carry out instructions to perform the above methods.

The network-element device 1900 may further include a power supply component 1926 configured to perform power management of the network-element device 1900, a wired or wireless network interface 1950 configured to connect the network-element device 1900 to the network, and an I/O interface 1958. The network-element device 1900 may operate an operating system stored in the memory 1932, such as Windows Server™, Mac OS X™, Linux™, FreeBSD™, etc.

In an exemplary implementation, a non-transitory computer readable storage medium is provided, such as the memory 1932 storing computer program instructions. The computer program instructions can be carried out by the processing component 1922 of the network-element device 1900 to perform the above methods.

This disclosure can be a system, a method, and/or a computer program product. The computer program product includes a computer readable storage medium, which carries computer readable program instructions for a processor to implement various aspects of the disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of a computer-readable storage medium include: portable computer disk, hard disk, random access memory (RAM), read only memory (ROM), erasable programmable ROM (EPROM or flash memory), static RAM (SRAM), portable compact disk ROM (CD-ROM), digital multifunction disk (DVD), a memory stick, a floppy disk, a mechanical encoding device, such as a punch card or a convex structure in a groove on which instructions are stored, and any suitable combination of the above. The computer-readable storage medium used herein is not interpreted as an instantaneous signal itself, such as a radio wave or other freely propagating electromagnetic wave, an electromagnetic wave propagating through a waveguide or other transmission medium (for example, an optical pulse through an optical fiber cable), or an electrical signal transmitted through a wire.

The computer-readable program instructions described herein may be downloaded from a computer-readable storage medium to various computing/processing devices, or to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network and forwards the computer-readable program instructions to be stored in the computer-readable storage medium in each computing/processing device.

The computer program instructions for performing the operations of the disclosure may be assembly instructions, instruction set architecture (ISA) instructions, machine instructions, machine related instructions, microcode, firmware instructions, status setting data, or source code or object code written in any combination of one or more programming languages. The programming languages include object-oriented programming languages such as Smalltalk, C++, etc., and conventional procedural programming languages such as "C" language or similar programming languages. Computer readable program instructions may be executed completely on a user's computer, partially on the user's computer, as a separate software package, partially on the user's computer and partially on a remote computer, or completely on the remote computer or server. In the case of the remote computer, the remote computer may be connected to the user computer through any kind of network, including a LAN or a WAN, or may be connected to an external computer (for example, connected through an Internet via an Internet service provider). In some implementations, an electronic circuit such as a programmable logic circuit, a field programmable gate array (FPGA), or a programmable logic array (PLA) can be personalized by utilizing the state information of computer-readable program instructions. The electronic circuit can carry out computer readable program instructions, so as to implement various aspects of the disclosure.

Various aspects of the disclosure are described herein with reference to flowcharts and/or block diagrams of methods, devices (systems) and computer program products according to implementations of the disclosure. It should be understood that each block of a flowchart and/or block diagram and a combination of blocks in the flowchart and/or block diagram may be implemented by computer-readable program instructions.

These computer-readable program instructions can be provided to a processor of a general-purpose computer, a special-purpose computer, or other programmable data processing devices, so as to produce a machine so that when these instructions are executed by a processor of a computer or other programmable data processing devices, a device is generated to realize the functions/actions specified in one or more blocks in the flowchart and/or block diagram. These computer-readable program instructions may also be stored in a computer-readable storage medium, to cause computers, programmable data processing devices, and/or other devices to operate in a specific manner, so that the computer-readable medium in which the instructions are stored includes a manufacture which includes instructions to implement various aspects of the functions/actions specified in one or more blocks in the flowchart and/or block diagram.

Computer readable program instructions may also be loaded onto a computer, other programmable data processing devices, or other devices, so that a series of operation steps are performed on the computer, other programmable data processing device, or other devices to generate a computer implemented process, so that instructions executed in the computer, other programmable data processing device, or other devices can realize the functions/actions specified in one or more blocks in the flowchart and/or block diagram.

The flowchart and block diagram in the accompanying drawings show the architecture, functions and operations of possible implementations of systems, methods and computer program products according to various implementations of the disclosure. In this regard, each block in the flowchart or block diagram may represent a part of a module, program segment, or instruction containing one or more executable instructions for realizing a specified logical function. In some alternative implementations, the functions marked in the blocks may also occur in a different order than those marked in the drawings. For example, two consecutive blocks can actually be executed basically in parallel, and they sometimes can be executed in the opposite order, depending on the function involved. It should also be noted that each block in the block diagram and/or flowchart and the combination of blocks in the block diagram and/or flowchart can be realized by a dedicated hardware based system performing specified functions or actions, or by a combination of dedicated hardware and computer instructions.

Various implementations of the present disclosure have been described above, and the above description is exemplary rather than exhaustive, and is not limited to the various implementations disclosed. Without departing from the scope and spirit of the various implementations described, many modifications and changes are obvious to those skilled in the art. The terms used herein are selected to best explain the principle, practical application, or improvement of the technology in the market of each implementation, or to enable other ordinary skilled person in the art to understand the various implementations disclosed herein.

What is claimed is:

1. A blind detection method for a control channel, performed by a terminal device and comprising:
    obtaining downlink control information (DCI) of a plurality of subframes through blind detection of the control channel; and
    determining validity of the DCI of the plurality of subframes in repetition times adopted in the blind detection of the control channel to obtain a decision result,
    wherein the determining the validity of the DCI of the plurality of subframes in repetition times adopted in the blind detection of the control channel to obtain the decision result comprises:
    determining validity of stored DCI according to the stored DCI and DCI of a current subframe in repetition times adopted in the blind detection of the control channel;
    determining the stored DCI as non-false detection in a case that the stored DCI is the same as any DCI of the current subframe; and
    determining the stored DCI as false detection in a case that the stored DCI is different from all of DCI of the current subframe.

2. The method according to claim 1, further comprising:
    discarding the DCI when the DCI is determined as false detection; and
    outputting the DCI as DCI of non-false detection when the DCI is determined as non-false detection.

3. The method according to claim 1, wherein the determining the validity of the DCI of the plurality of subframes in repetition times adopted in the blind detection of the control channel to obtain the decision result comprises:
    determining the DCI as non-false detection in a case that DCI of at least two subframes are the same in repetition times adopted in the blind detection of the control channel.

4. The method according to claim 1, wherein the determining the validity of the DCI of the plurality of subframes in repetition times adopted in the blind detection of the control channel to obtain the decision result further comprises:

determining validity of the DCI of the current subframe in a case that the stored DCI is different from all of the DCI of the current subframe;
determining the DCI of the current subframe as false detection in a case that a first preset condition is not satisfied; and
determining the validity of the DCI of the current subframe according to a second preset condition in a case that the first preset condition is satisfied.

5. The method according to claim 4, wherein the first preset condition comprises that:
actual repetition times indicated by the DCI of the current subframe is not less than the repetition times adopted in current blind detection.

6. The method according to claim 4, wherein the first preset condition comprises that:
a value of each domain in the DCI falls into a corresponding valid value range of each domain in the DCI.

7. The method according to claim 4, wherein the first preset condition comprises that:
actual repetition times indicated by the DCI of the current subframe is not less than repetition times adopted in current blind detection; and
a value of each domain in the DCI falls into a corresponding valid value range of each domain in the DCI.

8. The method according to claim 4, wherein the determining the validity of the DCI of the current subframe according to the second preset condition comprises:
determining the DCI of the current subframe as non-false detection in a case that a current subframe number is equal to an end subframe number indicated in the DCI of the current subframe.

9. The method according to claim 8, further comprising:
updating the stored DCI according to the DCI of the current subframe in a case that the current subframe number is smaller than the end subframe number indicated in the DCI of the current subframe.

10. The method according to claim 1, further comprising:
clearing a buffer for storing the DCI in at least one of following cases: the stored DCI being determined as false detection, or before blind detection of the control channel for a start subframe.

11. The method according to claim 1, further comprising:
terminating blind detection of a candidate set corresponding to the DCI in actual repetition times indicated by the DCI in a case that the stored DCI is determined as non-false detection.

12. A terminal device, comprising:
a processor; and
a memory for storing instructions which are configured to be executed by the processor;
wherein the processor, when executing the executable instructions stored in the memory, is configured to:
obtain downlink control information (DCI) of a plurality of subframes through blind detection of the control channel; and
determine validity of the DCI of the plurality of subframes in repetition times adopted in the blind detection of the control channel to obtain a decision result,
wherein in terms of the determining the validity of the DCI of the plurality of subframes in repetition times adopted in the blind detection of the control channel to obtain the decision result, the processor is configured to:
determine validity of stored DCI according to the stored DCI and DCI of a current subframe in repetition times adopted in the blind detection of the control channel;
determine the stored DCI as non-false detection in a case that the stored DCI is the same as any DCI of the current subframe; and
determine the stored DCI as false detection in a case that the stored DCI is different from all of DCI of the current subframe.

13. The terminal device according to claim 12, wherein in terms of the determining the validity of the DCI of the plurality of subframes in repetition times adopted in the blind detection of the control channel to obtain the decision result, the processor is configured to:
determine the DCI as non-false detection in a case that DCI of at least two subframes are the same in repetition times adopted in the blind detection of the control channel.

14. The terminal device according to claim 12, wherein in terms of the determining the validity of the DCI of the plurality of subframes in repetition times adopted in the blind detection of the control channel to obtain the decision result, the processor is further configured to:
determine validity of the DCI of the current subframe in a case that the stored DCI is different from all of the DCI of the current subframe;
determine the DCI of the current subframe as false detection in a case that a first preset condition is not satisfied; and
determine the validity of the DCI of the current subframe according to a second preset condition in a case that the first preset condition is satisfied.

15. The terminal device according to claim 14, wherein the first preset condition comprises that:
actual repetition times indicated by the DCI of the current subframe is not less than the repetition times adopted in current blind detection.

16. The terminal device according to claim 14, wherein in terms of the determining the validity of the DCI of the current subframe according to the second preset condition, the processor is configured to:
determine the DCI of the current subframe as non-false detection in a case that a current subframe number is equal to an end subframe number indicated in the DCI of the current subframe.

17. The terminal device according to claim 16, wherein the processor is further configured to:
update the stored DCI according to the DCI of the current subframe in a case that the current subframe number is smaller than the end subframe number indicated in the DCI of the current subframe.

18. A non-volatile computer readable storage medium configured to store computer program instructions which, when executed by a processor, are operable with the processor to:
obtain downlink control information (DCI) of a plurality of subframes through blind detection of the control channel; and
determine validity of the DCI of the plurality of subframes in repetition times adopted in the blind detection of the control channel to obtain a decision result,
wherein in terms of the determining the validity of the DCI of the plurality of subframes in repetition times adopted in the blind detection of the control channel to obtain the decision result, the computer program instructions are operable with the processor to:
determine validity of stored DCI according to the stored DCI and DCI of a current subframe in repetition times adopted in the blind detection of the control channel;

determine the stored DCI as non-false detection in a case that the stored DCI is the same as any DCI of the current subframe; and determine the stored DCI as false detection in a case that the stored DCI is different from all of DCI of the current subframe.

* * * * *